April 5, 1927.
E. W. LEAHY
1,623,879
MOTOR VEHICLE HEATER
Filed Oct. 31, 1925
2 Sheets-Sheet 2
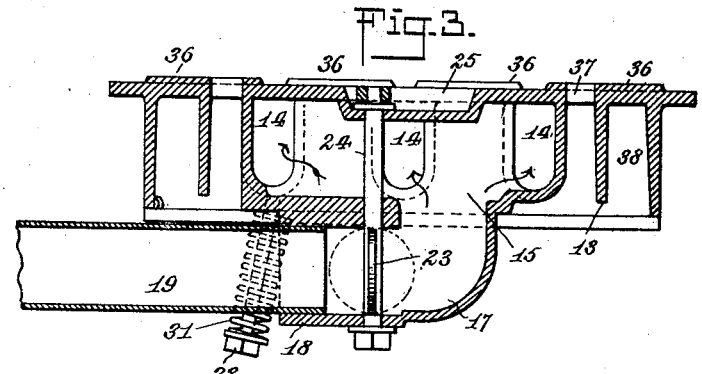
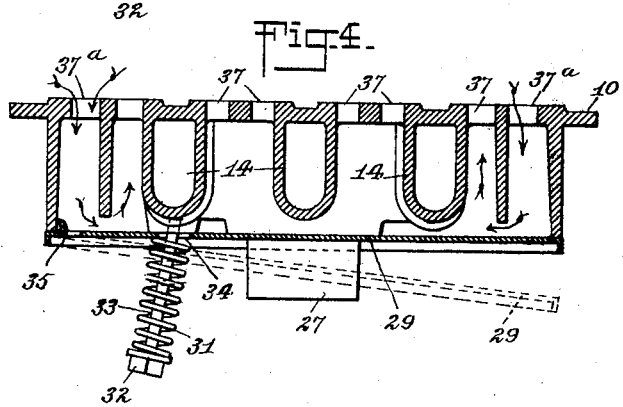
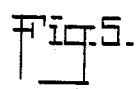
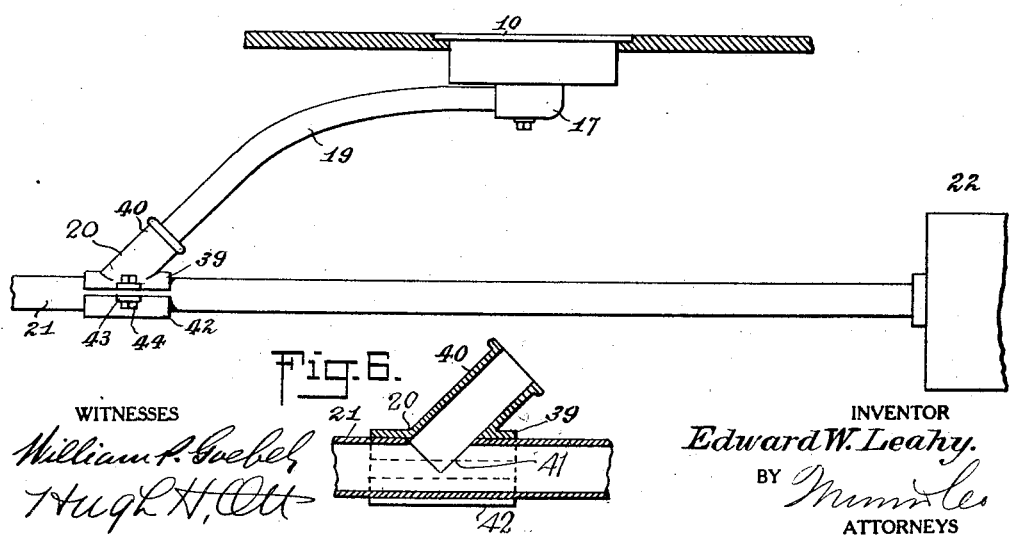
WITNESSES
INVENTOR
Edward W. Leahy.
BY
ATTORNEYS Patented Apr. 5, 1927.

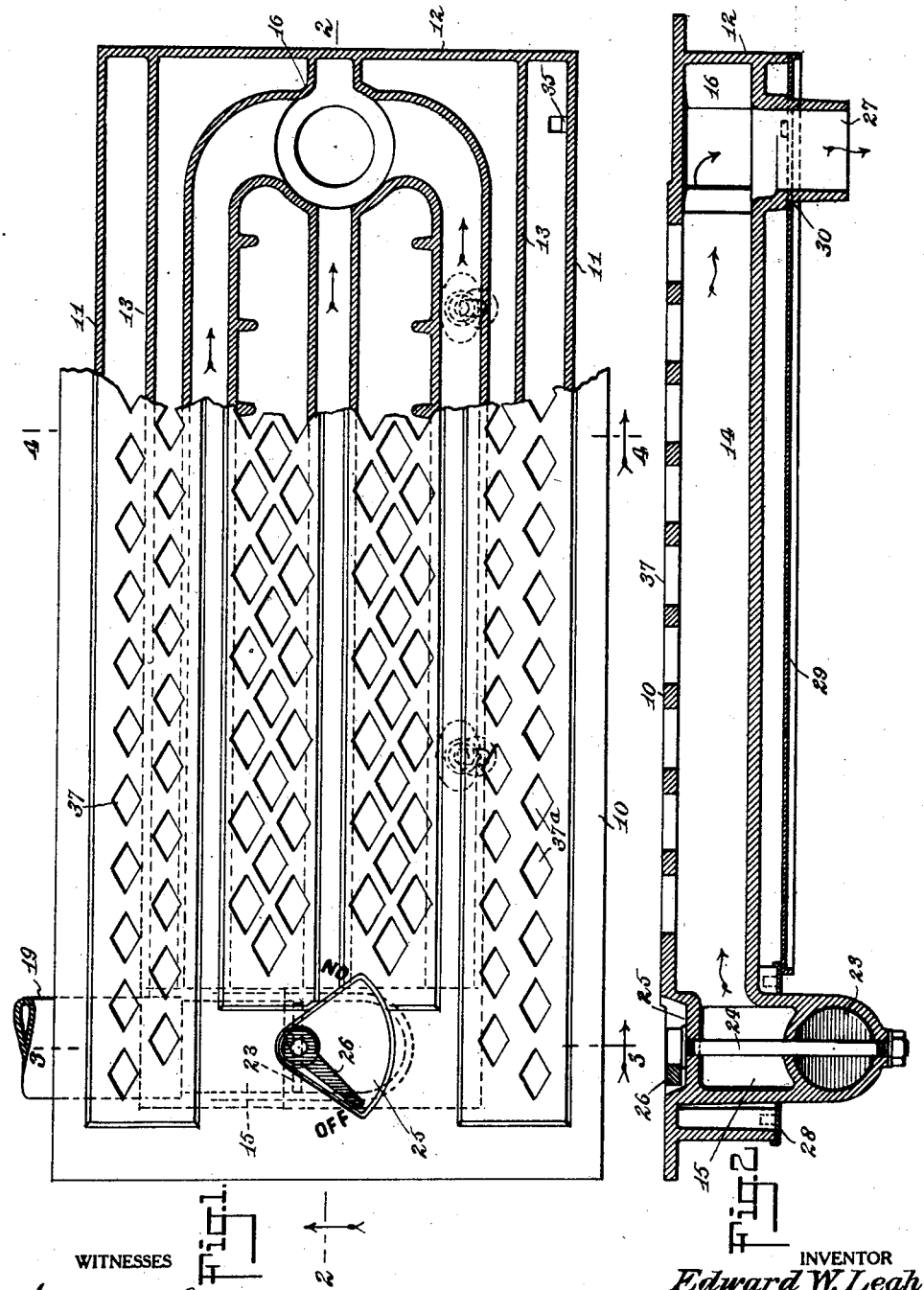

1,623,879

UNITED STATES PATENT OFFICE.

EDWARD W. LEAHY, OF ALBANY, NEW YORK.

MOTOR-VEHICLE HEATER.

Application filed October 31, 1925. Serial No. 66,060.

This invention relates to heaters and has particular reference to an improvement in what are generally termed "exhaust heaters" installed in vehicles driven by internal combustion motors.

Heaters of this character which have heretofore been devised and which are now in general use, are open to many objections and principally owing to the fact that they give off an offensive odor by reason of dust, dirt and other foreign matter collecting and accumulating alongside of and in contact with the radiator pipes.

The present invention comprehends a heater of the character set forth which is adapted to be arranged in the floor of the tonneau of a motor vehicle in which the radiator or heated pipe elements are suspended from the coil and out of contact with the bottom wall of the heater casing and with the heated pipes disposed between the interstices in the grille work so that dust, dirt, or other foreign matter will have a clear passage between the pipes and will collect and accumulate on the floor of the casing at a point sufficiently spaced from the heated pipes to prevent scorching and the giving off of an offensive odor.

As a further object the invention comprehends a heater in which the floor is capable of being tilted to discharge the accumulations of dust, dirt and other foreign matter periodically.

As a further object the invention comprehends an exhaust heater in which the heating pipes, the side walls of the casing and the grilled top wall thereof are cast as a whole in one piece to reduce the expense of production and to render the same gas-tight to minimize the possibility of leakage of exhaust gases into the heater casing.

The invention furthermore comprehends an exhaust heater in which the upper grilled wall is provided with depressed portions adjacent the heating pipes whereby the raised grille portions with which the occupants' feet contact, will prevent scorching of the soles of the shoes.

The invention furthermore comprehends an exhaust heater of the character set forth having a casing formed with outer partitioned compartments having apertures through which the cold air descends and is subsequently heated and returned from the central heating compartment through the center grille openings to the tonneau of the vehicle, so that the heater works on the principle of a pipeless furnace.

As a still further object, the invention contemplates a device of the character described which is comparatively simple in its construction and mode of use, which is inexpensive to manufacture and install, and which is highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a plan view of an exhaust heater constructed in accordance with the invention, parts being broken away and shown in section to disclose the underlying structure;

Fig. 2 is a longitudinal sectional view therethrough taken approximately on the line 2—2 of Fig. 1;

Fig. 3 is a transverse sectional view taken approximately on the line 3—3 of Fig. 1;

Fig. 4 is a similar view taken approximately on the line 4—4 of Fig. 1;

Fig. 5 is a side view illustrating the installation of the heater;

Fig. 6 is a fragmentary detail sectional view through the union and exhaust pipe.

Referring to the drawings by characters of reference, 10 designates the top wall of the heater casing which is cast or otherwise formed integral with the side and end walls 11 and 12 and the longitudinally extending partition walls 13 which are disposed parallel to the side walls 11 and which extend from one end wall 12 to the opposite end wall 12. Also cast integral with the top wall are a plurality of spaced parallel longitudinal pipes 14 communicating at one end with an inlet manifold 15 and at the other end with an outlet manifold 16, the former manifold having a depending integral valve casing 17, the inlet end 18 of which is connected by a suitable conduit 19 with a union 20 to establish communication with the motor exhaust pipe 21 in advance of the muffler 22. The valve casing has mounted therein a suitable valve element 23 connected to a valve stem 24 which extends vertically through the valve casing and the manifold 15 into a recess 25 in the upper wall 10 of the casing. A radial manipulating arm 26 disposed within the recess 25, is connected with the upper projecting end of the valve stem for facilitating the opening and closing of the valve element to respectively cut off or permit the passage of the heated exhaust gases through the heat radiating pipes 14.

The under side of the casing adjacent the intake manifold 15 and valve 17, is covered by a stationarily secured bottom wall section 28 while the remaining major portion of the under side of the casing is closed by a bottom wall section or plate 29 formed with an aperture 30 to accommodate the outlet nozzle 27, the said bottom wall section or plate 29 being normally maintained in closed relation to the casing by means of springs 31 interposed between the section or plate 29 and the heads or nuts 32 at the outer ends of stems or shanks 33 which project through openings 34 in said section or plate. In order to fulcrum one longitudinal edge of the section or plate to permit of the depression of the opposite edge, the said section or plate is formed with upstruck lugs 35 engaging within the inner surface of the lower edge of the adjacent side wall 11. Under his arrangement it is obvious that the opposite edge of the plate or section 29 may be forced downwardly to tilt the plate or section for gravitationally discharging accumulations of dust, dirt, or other foreign matter from its upper face.

The upper face of the top wall 10 is provided with spaced longitudinally extending beads or embossments 36 formed with grille openings 37, and it will be noted that the suspended or depending heated apertured pipes 14 are disposed in alinement with the spaces between the beads or embossments 36, with the lower ends of said pipes substantially spaced above the upper surface of the plate or section 29, so that dust, dirt or other foreign matter entering the casing through the grille openings 37 will be prevented from contacting with the radiator pipes 14 either during their passage and descent through the casing or upon their accumulation upon the upper surface of the plate or section 29, so that scorching thereof and giving off of an offensive odor is precluded. The thickened portion of the top wall produced by the beads or embossments 36 will prevent occupants of the vehicle from disposing the soles of their shoes in contact with the thinner and more highly heated portions of the top wall lying between the beads or embossments. The outermost grille openings 37ª which communicate with the outer compartments 38 defined between the longitudinally extending and depending partition walls 13, will receive the cold air in the bottom of the tonneau of the vehicle, which air will descend into the compartments 38 as indicated by the arrows, and thence pass underneath the lower edges of the partition plates 13 into the central compartment where the air will be subjected to the radiation of the heat from the heated radiator pipes 14 and rise through the remaining central grille openings 37.

As specifically illustrated, the union 20 consists of a split sleeve-like body, the upper section 39 of which is preferably provided with an angular branch 40 with which the conduit 19 communicates, and said upper section being fitted over a V-shaped cutaway portion 41 in the exhaust pipe, while the lower section 42 of the sleeve-like body embraces a diametrically opposite point of the exhaust pipe, the sections 39 and 42 being provided with apertured ears 43 with which clamping bolts 44 co-operate to clamp the union in place on the exhaust pipe 21.

In use and operation, a portion of the heated gases from the exhaust of the motor are led or induced through the union 20 and the conduit 19 to the inlet valve 17 when the valve element 23 is opened so that the heated exhaust gases passing through the radiator pipes heat the same and permit the heated air to escape through the central grille openings 37 to the tonneau of the vehicle.

What is claimed is:

1. In a heater for motor vehicles, a radiator including a plurality of heating pipes and a casing housing, the heating pipes, having a grilled upper wall, the heating pipes being disposed directly against and depending from the under surface of the upper wall, the said heating pipes presenting vertical outer side surfaces within the confines of the non-open portions of the grille-work and having the lower end surfaces spaced from the bottom of the casing whereby to prevent the giving off of offensive ordors by the collection of dust, dirt or other foreign matter on the surfaces of the heating pipes.

2. In a heater for motor vehicles, a radiator including a plurality of heating pipes and a casing housing the heating pipes, having a grilled upper wall, the heating pipes being disposed directly against and depending from the under surface of the upper wall, the said heating pipes presenting vertical outer side surfaces within the confines of the non-open portions of the grille-work and having the lower end surfaces spaced from the bottom of the casing, whereby to prevent the giving off of offensive odors by the collection of dust, dirt or other foreign matter on the surfaces of the heating pipes, the casing having a bottom wall movable from a normal horizontal position closing the bottom of the casing, to an inclined position for opening the bottom of the casing to discharge dust, dirt, or other foreign matter accumulated thereon.

3. An automobile heater, comprising a radiator element having an outlet at one end and a valved inlet connection at its opposite end with the motor exhaust for receiving therethrough heated exhaust gases when the valve connection is opened, a housing for said radiator element including a top wall formed with grilled portions, side and end walls, and a tiltable bottom wall, the said radiator element being disposed directly beneath and depending from the under side of the top wall between the grilled portions and spaced above the bottom wall whereby to preclude offensive odors by preventing contact with the radiator element of foreign matter falling through the grilled portions of the top wall and collecting upon the bottom wall, said casing having depending partitions spaced from and parallel to the side walls to define side chambers communicating at their lower ends with the remaining central portion of the casing and adapted to receive cold air through the grilled portions which register with said side chambers for heating the cold air descending therethrough to the bottom of the tonneau of the vehicle.

4. In an internal combustion motor exhaust heated radiator for motor vehicles, including a plurality of radiator pipes, a housing therefor having a top wall formed with spaced rows of grille openings extending longitudinally of the housing, marginal side walls depending from the upper wall, and a tiltable bottom wall normally closing the bottom of the housing, the said radiator pipes being suspended from the underside of the top wall and arranged between the rows of grille openings and spaced above the bottom wall, whereby dust, dirt and other foreign matter entering the housing through the grille openings and accumulating upon the bottom wall will be prevented from coming into contact with the radiator pipes and giving off an offensive odor.

EDWARD W. LEAHY.